(12) United States Patent
Godon et al.

(10) Patent No.: US 9,199,331 B2
(45) Date of Patent: Dec. 1, 2015

(54) METHOD FOR FABRICATING A SINGLE-PIECE PART FOR A TURBINE ENGINE BY DIFFUSION BONDING

(75) Inventors: Thierry Godon, Sevran (FR); Bruno Jacques Gerard Dambrine, Le Chatelet en Brie (FR)

(73) Assignee: SNECMA, Paris (FR)

( * ) Notice: Subject to any disclaimer, the term of this patent is extended or adjusted under 35 U.S.C. 154(b) by 78 days.

(21) Appl. No.: 14/117,718

(22) PCT Filed: May 11, 2012

(86) PCT No.: PCT/FR2012/051058
§ 371 (c)(1),
(2), (4) Date: Nov. 14, 2013

(87) PCT Pub. No.: WO2012/156632
PCT Pub. Date: Nov. 22, 2012

(65) Prior Publication Data
US 2014/0068937 A1    Mar. 13, 2014

(30) Foreign Application Priority Data
May 18, 2011    (FR) .................................... 11 54326

(51) Int. Cl.
*B23K 20/02* (2006.01)
*C22C 14/00* (2006.01)
*F01D 5/02* (2006.01)
*B23P 13/00* (2006.01)
*B23P 15/04* (2006.01)

(52) U.S. Cl.
CPC .............. *B23K 20/021* (2013.01); *B23P 13/00* (2013.01); *B23P 15/04* (2013.01); *C22C 14/00* (2013.01); *F01D 5/02* (2013.01); *F05D 2230/236* (2013.01); *F05D 2230/31* (2013.01); *F05D 2240/60* (2013.01); *F05D 2250/141* (2013.01); *F05D 2300/614* (2013.01); *Y02T 50/672* (2013.01); *Y10T 29/49316* (2015.01); *Y10T 29/49826* (2015.01)

(58) Field of Classification Search
CPC ....... B23K 20/021; B23P 15/04; B23P 13/00; C22C 14/00; F01D 5/02; Y10T 29/49316; Y10T 29/49826
See application file for complete search history.

(56) References Cited

U.S. PATENT DOCUMENTS

| 5,356,701 A | 10/1994 | Wei et al. |
| 5,440,806 A | 8/1995 | Wei et al. |
| 5,557,846 A | 9/1996 | Wei et al. |
| 6,658,715 B1 | 12/2003 | Podesta' |

FOREIGN PATENT DOCUMENTS

EP    1 099 774    5/2001

OTHER PUBLICATIONS

International Search Report Issued Nov. 15, 2012 in PCT/FR12/051058 Filed May 11, 2012.

*Primary Examiner* — Moshe Wilensky
(74) *Attorney, Agent, or Firm* — Oblon, McClelland, Maier & Neustadt, L.L.P.

(57) ABSTRACT

A method of fabricating a single-piece part for a turbine engine by diffusion bonding, the method including making a blank for the part around a mandrel, the blank including a plurality of coaxial and superposed annular layers of independent rings of metal wire that are stacked on one another around the mandrel, and subjecting the blank to hot isostatic pressing to obtain a single-piece part, and optionally machining the part.

16 Claims, 2 Drawing Sheets

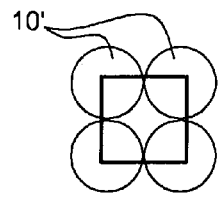
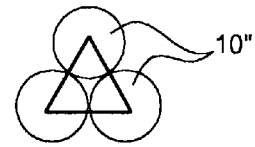
Fig. 6　　　　Fig. 7
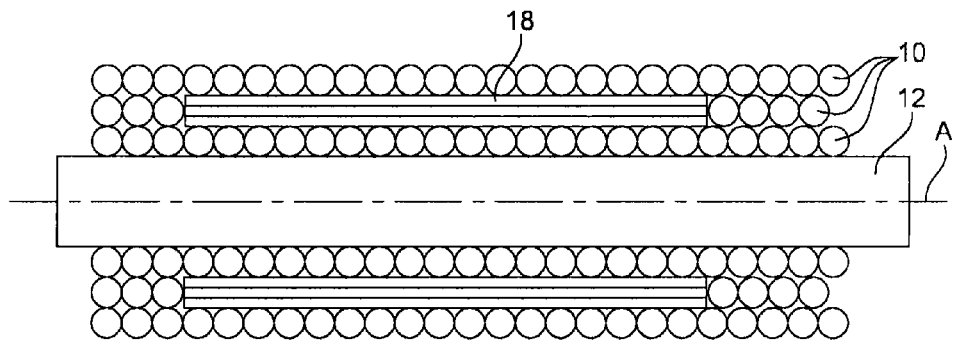
Fig. 8
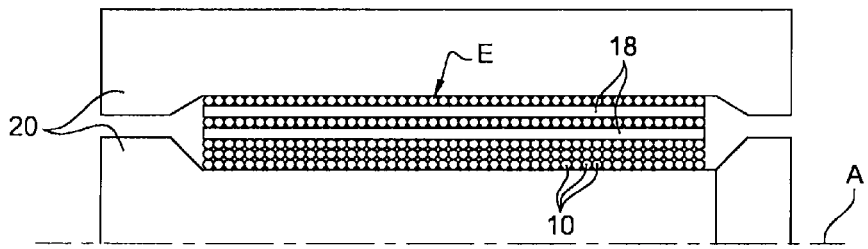
Fig. 9
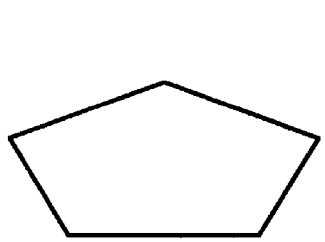
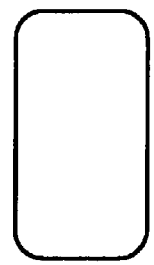
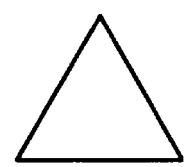
Fig. 10　　Fig. 11　　Fig. 12

METHOD FOR FABRICATING A SINGLE-PIECE PART FOR A TURBINE ENGINE BY DIFFUSION BONDING

BACKGROUND OF THE INVENTION

1. Field of the Invention

The present invention relates to a diffusion-bonding method of fabricating a single-piece part for a turbine engine, such as an airplane turboprop or turbojet, the part being constituted, for example, by a power transmission shaft between the main shaft of a turbojet and an accessory gearbox (AGB) for driving accessory equipment of the engine.

2. Description of the Related Art

The AGB shaft is relatively fine and long, with a length of the order of one meter for large diameter engines, and it is generally made in two portions that are arranged end-to-end for reasons of mechanical strength and of withstanding vibration. The adjacent ends of these two portions are guided and centered in rotation by an intermediate bearing that allows the frequencies of resonant modes of vibration to pass.

Proposals have already been made to fabricate such a shaft as a single piece by diffusion bonding. That method consists in forming a blank for the shaft about a rotating cylindrical mandrel, by taking at least one metal wire from a reel or a spool and winding it onto the mandrel so as to form a plurality of coaxial and superposed annular layers of metal wire that surround the mandrel, each of which layers is made up of a plurality of touching turns, and then in subjecting the blank to diffusion bonding treatment by hot isostatic pressing (HIP) in appropriate tooling. The resulting part is a single piece and may be subjected to machining for finishing, should that be necessary.

It is also known to reinforce that type of part with metal-coated ceramic fibers that are wound as one or more layers on the mandrel between two layers of metal wires, respectively an inner layer and an outer layer.

Earlier patent applications FR 11/50194, FR 11/51706, and FR 11/52129 in the name of the Applicant describe methods of the above-specified type.

Nevertheless, the methods of the prior art do not make it possible to fabricate parts of non-circular section since it is difficult or indeed impossible to wind a metal wire around a mandrel of a shape that is not cylindrical.

A particular object of the invention is to provide a solution to this problem that is simple, effective, and inexpensive.

BRIEF SUMMARY OF THE INVENTION

To this end, the invention provides a method of fabricating a single-piece part for a turbine engine by diffusion bonding, the method comprising the steps consisting in:

making a blank for the part around a mandrel, the blank comprising a plurality of coaxial and superposed annular layers of metal wires;

subjecting the blank to hot isostatic pressing in order to obtain a single-piece part; and optionally machining the part;

the method being characterized in that each layer of metal wires in the blank is made up of independent rings that are engaged and stacked on the mandrel.

According to the invention, the metal wires form independent rings that do not come directly from a reel or a spool and that are not wound onto the mandrel, thus making it possible to make parts of section that may be circular or non-circular. The rings may be stacked on the mandrel at ambient temperature.

Parts of circular section are made from the rings that are circular in shape and that are engaged on a mandrel that is cylindrical. Parts of non-circular section (and for example of section that is polygonal: triangular, rectangular, square, etc.) are made from rings of corresponding non-circular shape that are engaged on a mandrel of complementary (non-cylindrical) shape.

The rings are engaged on the mandrel by being placed at one end of the mandrel, on its axis, and then being moved in translation onto the mandrel, parallel to its longitudinal axis. When the mandrel is vertically oriented, the rings in any given layer are stacked one on another. When the mandrel is horizontally oriented, the rings in any given layer are arranged horizontally side-by-side.

Pressing may be performed in an isothermal press or in an autoclave bag, depending on the number of parts to be produced.

According to another characteristic of the invention, the rings are pre-formed prior to being engaged on the mandrel in order to adopt the above-mentioned circular or non-circular shape. Pre-forming the rings enables them to take on any shape corresponding to the section of the part to be made. By way of example, when a shaft of polygonal section is to be made, the rings of an inner layer are polygonal in shape, and the rings of an outer layer have the same polygonal shape with a transverse size that is greater than that of the rings of the inner layer. The rings may be pre-formed manually (for metal wires of small diameter), or by means of appropriate tooling.

By way of example, the diameter of the metal wire constituting the rings may lie in the range 1 millimeter (mm) to 6 mm approximately. The mandrel has a radius that is preferably greater than the diameter of the metal wire of the rings.

The rings may be closed or non-split. Under such circumstances, the inner and outer diameters of the rings are constant, and each ring of an outer layer extends around a ring of an inner layer and is transversely in alignment with this ring of the inner layer. The outside diameter of a ring of an inner layer is equal to the inside diameter of a ring of the outer layer surrounding the inner layer. Closed rings may be obtained directly by means of their method of fabrication. In a variant, they may be obtained by shaping a metal wire so that its free ends are moved towards each other and then fastened together, e.g. by welding.

When consideration is given to four adjacent rings occupying two layers, i.e. an inner layer made up of two rings and an outer layer made up of two rings surrounding the two rings of the inner layer, the stacking of these (same diameter) rings is of the square type. Specifically, a half-view in cross-section of these rings comprises four circles having their centers situated at the four corners of a square. In a particular implementation of the invention, the expansion of this stack is about 21.5%.

In a variant, the rings are of the type that is open or split at a circumferential point. Under such circumstances, these rings are deformable by moving their free ends apart or towards each other. This makes it possible to vary the inside and outside diameters of the rings and enables the rings to be mounted on the mandrel in such a manner that each ring in an outer layer lies between two rings of an inner layer. The outside diameter of a ring of an inner layer is then greater than the inside diameter of a ring of the outer layer surrounding the inner layer. The stacking of these (same diameter) rings is of the equilateral triangle type, a half cross-section view of these rings comprising three circles having their centers situated at the corners of an equilateral triangle. In a particular implementation of the invention, the expansion of this stack is about 9.31%.

The opening of each split ring that is engaged on the mandrel is preferably angularly offset relative to the openings of the adjacent rings around the longitudinal axis of the mandrel. This makes it possible to distribute these openings around the longitudinal axis of the mandrel over the entire axial size of the mandrel and to avoid creating zones in the blank where the quantity of metal coming from the wires might be insufficient, thereby leading to voids in the part that is to be made.

By way of example, the part that is to be made is a shaft, or a disk, or a single-piece bladed ring of a turbine engine (a "blisk").

Advantageously, at least one annular layer of metal-coated ceramic fibers, e.g. constituted by a fabric or a sheet of fibers, is arranged between two layers of metal wires.

This layer of fibers serves to reinforce the part. Each fiber comprises a core made of ceramic material (such as silicon carbide, SiC) covered (e.g. by a high-speed coating) in a coating of metal (Ti, Al, B, etc.), this metal preferably being the same as the metal constituting the above-mentioned rings. After diffusion bonding, the part thus comprises a uniform metal matrix that performs a bonding function for the part and a protection function for the fibers that take up the forces to which the part is subjected. This technique makes it possible to increase the stiffness of the part without increasing its density. It also makes it possible to increase the ratio of Young's modulus over density for the part and to shift its resonant modes of vibration to high frequencies. For an AGB shaft, this technique makes it possible to omit the above-mentioned intermediate bearing, since it is no longer necessary. Other materials such as SiC fabrics, foils made of Ti, Al, or of TiAl, or of any other material presenting properties enabling superplastic forming and diffusion bonding to be performed may be wound or stacked around the mandrel.

BRIEF DESCRIPTION OF THE SEVERAL VIEWS OF THE DRAWINGS

The invention can be better understood and other characteristics, details, and advantages of the invention appear on reading the following description made by way of non-limiting example and with reference to the accompanying drawings, in which:

FIG. 6 is a diagram of the repetition pattern of a square stack as shown in FIG. 4, and FIG. 7 is a diagram of the repetition pattern of an equilateral triangle stack as shown in FIG. 5;

FIG. 8 is a diagrammatic axial section view of a mandrel on which metal rings are stacked in another step of the method of the invention;

FIG. 9 is a diagrammatic half-view in axial section of tooling used for diffusion bonding the part, and it illustrates another step of the method of the invention; and FIGS. 10 to 12 show non-circular rings in variant implementations of the method of the invention.

DETAILED DESCRIPTION OF THE INVENTION

Figure 1:
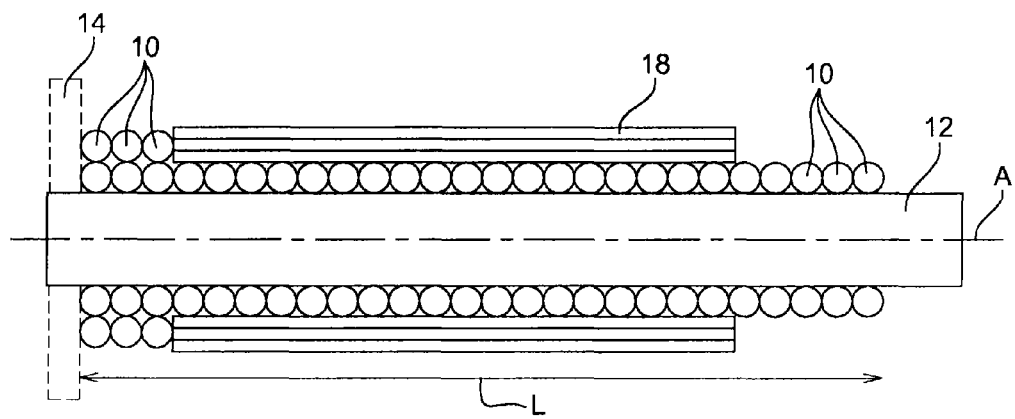
FIG. 1 is a diagrammatic axial section view of a mandrel on which a blank is formed by stacking metal rings, and it shows one step of the method of the invention.

Steps of a method of the invention are shown diagrammatically in FIGS. 1, 8, and 9, the method serving to fabricate a single-piece part for a turbine engine, such as a shaft, or a disk, or a single-piece bladed ring.

In a first step shown in FIG. 1, metal rings 10 are engaged on a mandrel 12 and stacked over a predetermined distance L so as to form one or more coaxial and superposed annular layers of metal rings around the mandrel. The rings 10 of a given layer have the same diameter and they are arranged side-by-side along the longitudinal axis A of the mandrel, the thickness of this layer being equal to the diameter of the metal wire from which the rings are made.

The mandrel 12 in the example shown is cylindrical in shape, but it could have a section of some other shape, e.g. triangular, square, rectangular, or polygonal, as described in greater detail below. The mandrel is arranged vertically or horizontally, and it may be stationary.

The rings 10 are engaged on the mandrel 12 by being positioned at one end of the mandrel, on the same axis as the mandrel, and then moved in translation along the mandrel, parallel to the axis A. An annular endplate 14 is preferably mounted on the mandrel at one end and forms bearing means for the first ring of each annular layer extending around the mandrel. The rings 10 are stacked over a distance L that is determined as a function of the length of the part to be fabricated. The number of rings per layer is a function of the diameter of the metal wire, which diameter may for example lie in the range 1 mm to 6 mm approximately.

The rings may be made of a titanium alloy of the TiA6V or Ti6242 type providing thermomechanical strength and light weight.

In a preliminary step (not shown) of the method of the invention, the rings 10 are formed in such a manner as to take on a shape corresponding to the shape of the part that is to be fabricated, which may have a section that is circular, square, rectangular, triangular, etc. This pre-forming step may be performed using a metal wire coming from a reel or a spool.

Figure 2:
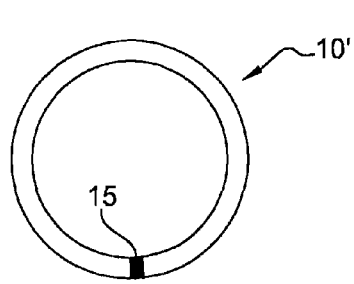
FIG. 2 is a diagrammatic view of a metal ring of the invention, of the closed or non-split type.
Figure 3:
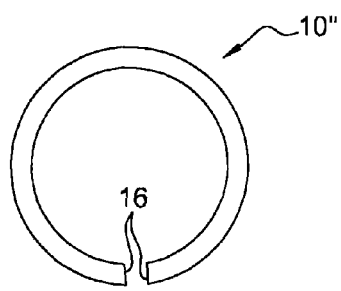
FIG. 3 is a diagrammatic view of a another variant embodiment of a metal ring of the invention, of the open or split type.

The rings 10', 10" are of the closed or non-split type, as shown in FIG. 2, or they are of the open or split type as shown in FIG. 3. In these two implementations of the invention, the rings are circular and they are for mounting on a cylindrical mandrel.

The closed rings 10' have inside and outside diameters that are constant. When they are obtained by pre-forming a metal wire, the facing free ends 15 of each ring 10' are moved towards each other and fastened together, e.g. by welding.

Figure 4:
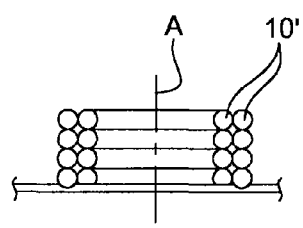
FIG. 4 is a diagrammatic axial section view of stacked closed rings.

FIGS. 4 and 6 show the type of stack (square) obtained with closed rings 10'. The inside diameter of the rings of the inner layer is substantially equal to or slightly greater than the outside diameter of the mandrel 12, and the outside diameter of the rings is substantially equal to or slightly less than the inside diameter of the rings of the outer layer (FIG. 4). Each ring of an inner layer is surrounded by a ring of an outer layer, these two rings being situated in a common plane that is transverse relative to the axis A. FIG. 6 shows the half cross-sections of four adjacent rings distributed in two layers, an inner layer formed by two rings and an outer layer formed by two rings surrounding the two rings of the inner layer. The stack is of the square type since the centers of the half-sections (of circular shape) of the wires are situated at the four corners of a square. In a particular implementation of the invention, the expansion of this stack is about 21.5%.

Figure 5:
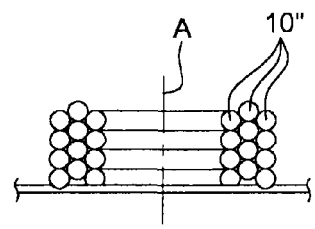
FIG. 5 is a diagrammatic axial section view of stacked split rings.

The diameters of the split rings 10" may be modified by moving their free ends 16 apart or towards each other (FIG. 3). FIGS. 5 and 7 show the type of stack (equilateral triangle) that is obtained with open rings 10". The inside diameter of the rings of the inner layer is substantially equal to or slightly greater than the outside diameter of the mandrel 12, and the outside diameter of these rings is greater than the inside diameter of the rings of the outer layer, thereby forcing the rings of the outer layer to adopt a position in which they are situated between two rings of the inner layer, and outside them (FIG. 5). Each ring of the outer layer is situated in a transverse plane lying substantially halfway between two transverse planes respectively containing the two adjacent rings of the inner layer. FIG. 7 shows the half cross-sections of three adjacent rings distributed over two layers, an inner layer made up of two rings and an outer layer situated on the outside and between the rings of the inner layer. The stack is of the equilateral triangle type since the centers of the sections (of circular shape) of the wires are situated at the corners of an equilateral triangle. In a particular implementation of the invention, the expansion of this stack is about 9.31%.

Preferably, the rings 10" are stacked on the mandrel in such a manner that their openings are offset angularly relative to one another about the axis A. These openings may thus be distributed in regular or in irregular manner around the axis A, thus making it possible to avoid creating zones in which metal would be lacking and in which voids could appear during the pressing stage.

As shown in FIG. 1, the inner layer of metal rings 10 is surrounded by a composite fiber structure that may be constituted by a fabric or a sheet of ceramic fibers 18 coated in metal. The metal coating the fibers 18 and the metal of the metal rings 10 are preferably identical in kind (e.g. being TiA6V or 6242) in order to optimize the subsequent step of the method relating to the hot isostatic pressing operation and the diffusion bonding.

The fabric or sheet of fibers 18 is wound on the first layer of metal rings 10 so that the fibers extend parallel to the axis A of the mandrel 12. Provision may be made to wind a plurality of fabrics or sheets from the same fabric, or from one or more other distinct fabrics that are wound coaxially. The fabrics may be of different kinds and they may have coated fibers of different diameters. The length of the composite fiber structure is less than or equal to the length L of the first layer of metal rings 10.

In a variant, the fibers 18 may be wound around the mandrel and extend circumferentially around the axis A.

As examples, the coated ceramic fibers may be made of SiC/Ti, of SiC/Al, SiC/B, etc.

A following step of the method of the invention shown in FIG. 8 consists in covering the above-mentioned fiber structure in at least one other layer of metal rings 10, the metal rings being stacked around the mandrel 12 as described above. Metal rings 10 are also arranged in front of and behind the fiber structure so that it is buried inside the metal of the final part to be made.

A blank E of the part is thus built up progressively around the mandrel. This blank E may have more than one thousand rings 10 and a plurality of fiber structures of the above-specified type, these fiber structures being separated from one another by at least one layer of metal rings.

Thereafter, the blank E is subjected to hot isostatic pressing treatment (HIP) in an isothermal press or else in an autoclave bag (where the choice between them depends in particular on the number of parts to be produced). The blank is placed in appropriate tooling 20 (FIG. 9) and strong pressing is exerted on the blank at a suitable high temperature so that the metal of the rings and of the coating on the fibers softens and creeps so as to fill all of the empty spaces between the rings of the various layers in order to bond together the various elements by diffusion bonding.

In a variant that is not shown, the blank is placed in a deformable mild steel pouch, which is then placed in an autoclave. The autoclave is raised to an isostatic pressure of 1000 bars and a temperature of 940° C. (for TiA6V), such that the entire pouch deforms, shrinking as a result of air being evacuated, and applies uniform pressure on the blank until the metal creeps and diffusion bonding is achieved.

Advantageously, a plurality of pouches may be inserted into the autoclave to make a plurality of parts simultaneously, thereby reducing fabrication costs.

The method of the invention makes it possible to make parts of section with a shape that is not circular, and for example with a section that is in the shape of a pentagon (FIG. 10), a rectangle (FIG. 11), or a triangle (FIG. 12). The pre-forming step of the method of the invention then consists in pre-forming the rings to give them a shape of the desired type, these rings being engaged and stacked on a mandrel having a section of complementary shape. For example, rings of rectangular shape are engaged on a mandrel in the form of a block of rectangular section for the purpose of making a single-piece part of rectangular section such as that shown in FIG. 11. These rings may be of the closed or non-split type, or else they may be of the open or split type.

The invention claimed is:

1. A method for fabricating a single-piece part for a turbine engine by diffusion bonding, the method comprising:
    making a blank around a mandrel, the blank including at least one layer of metal wires;
    subjecting the blank to a hot isostatic pressing to obtain a single-piece part; and
    optionally machining the part,
    wherein the at least one layer of metal wires in the blank includes rings independent from each other that are individually engaged around the mandrel and individually stacked on the mandrel.

2. A method according to claim 1, wherein the rings are of a circular shape.

3. A method according to claim 2, wherein the rings are pre-formed with said shape, prior to being engaged on the mandrel.

4. A method according to claim 1, wherein the mandrel is of a cylindrical shape.

5. A method according to claim 1, wherein the rings are closed rings.

6. A method according to claim 1, wherein the rings are split at a zone around a circumference.

7. A method according to claim 1, wherein an opening of each ring engaged on the mandrel is angularly offset relative to openings of adjacent rings around a longitudinal axis of the mandrel.

8. A method according to claim 1, wherein the single-piece part is one of a single-piece shaft, a disk, or a bladed ring of a turbine engine.

9. A method according to claim 1, wherein at least one annular layer of metal-coated ceramic fibers is arranged between two successive metal wire layers on the mandrel.

10. A method according to claim 1, wherein the rings are engaged on the mandrel by being positioned at an end of the mandrel, on a same axis as the mandrel, and by being moved in translation along the mandrel, parallel to the longitudinal axis.

11. A method according to claim 1, wherein:
    the making the blank comprises making a plurality of coaxial and superposed annular layers; and,
    each layer of metal wires includes independent rings that are engaged and stacked on the mandrel.

12. A method according to claim 1 wherein the rings are of a non-circular shape.

13. A method according to claim 1, wherein the mandrel is of a non-cylindrical shape.

14. A method according to claim 12, wherein the rings are pre-formed with said shape, prior to being engaged on the mandrel.

15. A method for fabricating a single-piece part for a turbine engine by diffusion bonding, the method comprising:
  making a blank around a mandrel, the blank including at least on layer of metal wires;
  subjecting the blank to a hot isostatic pressing to obtain a single-piece part; and
  optionally machining the part,
  wherein the at least one layer of metal wires in the blank includes rings independent from each other that are individually engaged around the mandrel and individually stacked on the mandrel, said rings being individually split at a zone around a circumference.

16. A method according to claim 15, wherein the opening of each split ring engaged on the mandrel is angularly offset relative to openings of adjacent rings around a longitudinal axis of the mandrel.

* * * * *